United States Patent [19]

Trautman

[11] Patent Number: 5,777,004
[45] Date of Patent: Jul. 7, 1998

[54] METHOD OF NEUTRALIZING PROTEIN ALLERGENS IN NATURAL RUBBER LATEX PRODUCT FORMED THEREBY

[75] Inventor: Jack C. Trautman, Middleton, Wis.

[73] Assignee: Allergen Reduction Inc., Middleton, Wis.

[21] Appl. No.: 846,733

[22] Filed: Apr. 30, 1997

[51] Int. Cl.$^6$ .............................. C09F 6/00; C08J 3/00; A61J 7/00; A61M 35/00
[52] U.S. Cl. ........................ 523/310; 524/925; 528/482; 528/491; 528/492; 602/77; 604/292
[58] Field of Search ...................... 523/310; 524/925; 528/482, 491, 492; 602/77; 604/292

[56] References Cited

U.S. PATENT DOCUMENTS 5,569,740  10/1996  Tanaka et al. ................. 528/502 F

OTHER PUBLICATIONS

Barinaga, Marcia, Getting Some "Backbone": How MHC Binds Peptides (14 Aug. 1992), *Science*, pp. 880–881.

Beezhold, D.H.; Sussman, G.L.; Kostyal, D.A.; and Chang, N.-S., "Identification of a 46–kD latex protein allergen in health care workers", *Clinical and Experimental Immunology* (Dec. 1994), vol. 98, No. 3, pp. 408–413.

Carey, Andrew B.; Cronish, Katrina, Ph.D.; Schrank, Paula; Ward, Bonnie; and Simon, Ronald, M.D., "Cross–reactivity of alternate plant sources of latex in subjects with systemic IgE–mediated sensitivity to *Hevea brasiliensis* latex", *Annals of Allergy, Asthma, & Immunology* (Apr. 1995), vol. 74, No. 4, pp. 317–320.

Garcia, K. Christopher; Degano, Massimo; Stanfield, Robyn L.; Brunmark, Anders; Jackson, Michael R.; Peterson, Per A.; Teyton, Luc; and Wilson, Ian A., "An αβ T Cell Receptor Structure at 2.5 Å and Its Orientation in the TCR–MHC Complex" (11 Oct. 1996), *Science*, vol. 274, pp. 209–219.

Karup, Viswanath P.; Murali, Pazhayannur S. and Kelly, Kevin J., "Latex Antigens" (Feb. 1995), *Immunology and Allergy Clinics of North America*, vol. 15, No. 1, pp. 45–59.

Jaeger, Doris, M.D.; Kleinhans, Dieter, M.D.; Czuppon, Adam B., Ph.D. and Baur, Xaver, M.D., "Latex–specific proteins causing immediate–type cutaneous, nasal, bronchial, and systemic reactions" *The Journal of Allergy and Clinical Immunology* (Mar. 1992), vol. 89, No. 3, pp. 759–768.

"Latex protein allergy: managing the issue" (19 Feb. 1996), A one day international conference organised by European Rubber Journal, Vrije Universiteit, Amsterdam, pp. 1–61.

Matsumura, Masazumi; Fremont, David H.; Peterson, Per A.; and Wilson, Ian A., "Emerging Principles for the Recognition of Peptide Antigens by MHC Class I Molecules" (14 Aug. 1992), *Science*, vol. 257, pp. 927–934.

Truscott, Wava, "The Industry Perspective on Latex" (Feb. 1995), *Immunology and Allergy Clinics of North America*, vol. 15, No. 1, pp. 89–121.

Official Monographs/Pancreatin, *The United States Pharmacopeia*, Twenty–first Revision (1985), pp. 777–778.

Proteolytic Activity in Dust Samples, Novo Industrias (1978), AF 162.3/2–GB, 5, pages.

Jens Adler–Nissen, Determination of the Degree of Hydrolysis of Food Protein Hydrolysates by Trinitrobenzenesulfonic Acid, (Nov./Dec. 1979), *Agricultural and Food Chemistry*, vol. 27, No. 6, p. 1256.

Anson Hemoglobin Method for determination of trypsin activity, Novo Industrias (1978), AF 4.1/5–GB, 10 pages.

Enzymatic Assay of Carboxypeptidase A and B (1976), Sigman Chemical Company, 2 pages.

Leucine Aminopeptidase, Microsomal (1983), Sigma Chemical Company, 1 page.

*Primary Examiner*—Nathan M. Nutter
*Attorney, Agent, or Firm*—DeWitt Ross & Stevens S.C.

[57] ABSTRACT

Disclosed is a method of treating natural rubber latex with protease and peptidase enzymes whereby protein allergens contained within the latex are degraded so as to be rendered non-allergenic to humans. The protein allergen-free natural rubber latex produced by the method and articles fabricated from the protein allergen-free product are also disclosed.

29 Claims, No Drawings

METHOD OF NEUTRALIZING PROTEIN ALLERGENS IN NATURAL RUBBER LATEX PRODUCT FORMED THEREBY

FIELD OF THE INVENTION

The invention is a method for neutralizing protein antigens in natural rubber latex, thereby rendering the latex and articles formed from the latex non-allergenic to humans. The invention is also drawn to the natural rubber latex product formed by the process and articles fabricated from natural rubber latex subjected to the process.

DESCRIPTION OF THE PRIOR ART

Allergenic reactions to natural rubber latex products have been recognized for several decades. However, only recently has latex allergy received significant attention from natural rubber latex manufacturers, users of latex products, and regulatory agencies such as the U.S Food and Drug Administration. While the first reports of allergic contact dermatitis (delayed-type hypersensitivity, known as Type IV) due to latex glove use date back to the 1930's, it was not until 1979 that a case of glove-related urticaria (i.e., a systemic allergic reaction, known as immediate-type hypersensitivity or Type I) was reported. Reports of Type I allergic reactions to latex gloves, condoms, and the like increased throughout the 1980's. In 1989, it was determined that such allergic reactions are IgE-mediated and are due to allergenic proteins found in natural rubber latex. See, for instance, Truscott, W. (1995), "The Industry Perspective on Latex," *Latex Allergy* 15(1): 89–121.

Several factors appear to be contributing to the increased incidence of Type I latex allergy. Among them include near universal precautions against the transmission of AIDS and other pathogens, which has resulted in increased glove usage; increased recognition and reporting; increased commercial availability of poor-quality gloves from newer, less-experienced manufacturers; and increased exposure to air-borne, protein-laden cornstarch, applied to finished gloves as a donning powder.

The cost of Type I latex allergy is significant both in terms of the human cost and the cost of accommodating those afflicted with the allergy. For instance, in pure monetary terms, the Ontario Workers' Compensation Board allowed 60 latex rubber-related claims in 1993. Twenty-five cases originated from health care facilities and eight cases were due to occupational asthma. The average cost, per case, for those who cannot be accommodated within the existing workplace was estimated to be $194,000. At Hamilton Civics Hospitals, a facility of approximately 3,000 employees, 300 employees were diagnosed with latex allergy, 10 of whom had severe anaphylactic episodes requiring emergency room treatment. (See *European Rubber Journal* "Latex protein allergy: managing the issue," proceedings of a one-day international conference held at Vrije University, Amsterdam, 19 Feb. 1996.)

The U.S. Food and Drug Administration has taken the position that reduction of the protein content as determined by the Lowry test (ASTM D5712) in latex rubber products will result in a large reduction or elimination of Type 1 allergenicity. However, extensive removal of proteins, as by double centrifugation of latex, has an adverse effect on the mechanical properties of gloves made from such latex. (See Truscott, supra.)

Several protocols for removing protein allergens from finished latex articles have been proposed, but all suffer from functional or economic shortcomings. For instance, wet-stripping latex gloves off the molds is reported to remove a large amount of protein allergens, but adapting existing facilities to accommodate wet-stripping is extremely expensive. Using a post-stripping process such as chlorination to degrade protein allergens has also been proposed, but such a process must be carefully monitored in order to prevent adversely impacting the physical properties of the latex article. Washing the finished articles after oven curing has also been proposed, but is also prohibitively expensive to incorporate into conventional manufacturing environments. Treatment of the finished article with protease enzymes has been proposed. However, as noted below, such a treatment fails to reduce the allergenicity of latex articles. (See Truscott, supra.)

For an excellent review of latex protein allergy, see Kurup, V. P., Murali, P. S., and Kelly, K. J. (1995) "Latex Antigens," *Latex Allergy* 15(1): 45–59.

There clearly exists a need for an economically-feasible protocol which neutralizes protein allergens found in natural latex rubber without adversely affecting the physico-mechanical properties of finished latex articles.

SUMMARY OF THE INVENTION

The invention is directed to a method of neutralizing protein allergens found in natural rubber latex. The method includes the step of treating natural rubber latex with at least one enzyme having protease activity and at least one enzyme having peptidase activity. These enzymes are designated generically herein as "proteases" (equivalent to term "proteinases") and "peptidases," respectively. The natural rubber latex is treated such that the protein allergens contained therein are degraded to polypeptide fragments and amino acids whose molecular weights are too small to elicit an allergic reaction in humans.

While the treatment step can take place in one step, it is preferred that the treatment includes the steps of first adjusting the natural rubber latex to a pH range of from about pH 9.50 to about pH 9.55 to ensure optimum enzyme activity. Then, in a first treatment step, treating the natural rubber latex with a protease enzyme in a vapor-tight vessel. Gentle, periodic agitation of the latex-enzyme mixture is preferred. Then, in a second treatment step, treating the natural rubber latex with a peptidase enzyme in a vapor-tight vessel. Again, gentle, periodic agitation of the latex-enzyme mixture is preferred.

The method can be practiced with equal success on raw natural rubber latex, centrifuged natural rubber latex, centrifuged and ammoniated natural rubber latex, and certain compounded natural rubber latexes. The method generally will not function with compounded latexes which contain protease and peptidase inhibitors, such as certain metallic compounds.

The invention is also drawn to the protein allergen-free natural rubber latex produced by the method described herein and to articles of manufacture made from the allergen-free natural rubber latex. In particular, the invention is drawn to natural rubber latex barrier gloves, dams, condoms, stents, catheters, and the like, which are extremely protein allergen-free.

The present invention is based upon the discovery that the natural protein allergens in natural rubber latex can be enzymatically hydrolyzed into small peptides and amino acids which then are not capable of causing Type-I allergenicity in humans. It has been shown that a reduction in Lowry test values (the standard test for aqueous extractable protein content, ASTM D5712) is not necessary to reduce the allergenicity of natural rubber latex products below the detection level of present test procedures. Further, latex products such as gloves which are fabricated from natural rubber latex treated according to the present invention have the same physical properties as conventionally-manufactured latex gloves.

While not being limited to any particular mode of action, it is believed that the hydrolysis products produced by the present method have an average molecular weight which is lower than what is required to cause an allergenic reaction in humans, generally on the order of seven or fewer amino acid residues. RAST Inhibition experiments utilizing natural rubber latex treated by the present method have confirmed that the latex so treated is far less allergenic than untreated natural rubber latex. And, as noted above, experiments have also shown that physical properties such as tensile strength, ultimate elongation, and modulus of gloves fabricated from latex treated using the present method are similar to gloves fabricated from untreated controls.

A tremendous advantage provided by the present invention is that it greatly reduces or even eliminates the occurrence of Type I allergenicity to latex products caused by protein allergens found in natural rubber latex. In the case of latex examination gloves, surgical gloves, condoms, and the like, this utility inures to the benefit of both the wearer and the other party. Aqueous extracts from latex emulsions which have been enzymatically treated according to the present invention, as well as extracts of products manufactured therefrom, contain a characterizing distribution of molecular weight peptides and amino acids ranging from about 200 to about 1000 Daltons. In comparison, the molecular weight distribution of protein components of untreated natural rubber latex ranges from about 2000 to 100,000 Daltons.

Another advantage of the present invention is its low cost. The total cost of enzyme per liter of 60% latex rubber treated ranges from about 1.5 to about 8 cents, depending largely upon the commercial availability of the enzymes chosen. For standard latex barrier examination gloves (about 6 grams each), this translates to a cost of about 0.025 to 0.08 cents per piece. This cost is far lower than the cost of other putative solutions to the protein allergen problem.

Another advantage of the present invention is that the process produces a natural rubber latex emulsion which is non-protein allergenic and which yields products whose physical characteristics are indistinguishable from products made from untreated rubber latex. This is a distinct advantage over other methods of removing proteins from natural rubber latex, such a double centrifugation, which adversely effect the physical characteristics of products formed from such a latex.

Other aims, objects, and advantages of the present method for neutralizing protein allergens in natural latex rubber will become apparent upon a complete reading of the "Detailed Description of the Invention" and the attached claims.

DETAILED DESCRIPTION OF THE INVENTION

It has been discovered that soluble and insoluble protein antigens in natural rubber latex can be enzymatically degraded to smaller peptide fragments which are non-allergenic. This protein degradation has no adverse effect on the mechanical properties (stress, modulus, elasticity, etc.) of articles made from the latex. The method includes treating natural rubber latex with proteases and peptidases, either combined in a one-step method or separately in a two-step method, to degrade proteins found within the rubber latex to a molecular weight which renders the proteins too small to elicit an allergic reaction in humans.

The method functions successfully using any now known or henceforth discovered enzyme having protease activity and/or peptidase activity. Such proteases and peptidases include, but are not limited to, enzymes isolated from animal, microbial, and plant sources. From a present cost perspective, enzymes derived from microbial sources are most economical due to their wide commercial availability. However, the preferred enzymes for use in the invention are enzymes having protease and/or peptidase activity which are isolated from mammalian sources or which are manufactured via recombinant genetics (or wholly synthetic methods) using mammalian gene-coding sequences. This preference is due to the fact that mammalian-derived proteases and peptidases are more easily heat-denatured than enzymes from microbial or plant sources. Consequently, the treatment enzymes themselves are more easily degraded during post-treatment processing. Additionally any residual mammalian-derived enzymes found in rubber products made from latex treated according to the invention are less likely to contribute to an allergic reaction in humans due to the close phylogenic relationship between mammals. While the preferred source of protease and peptidase enzymes of this invention are derived from animal pancreas glands other sources of proteases and peptidases will function with equal success.

From a non-limiting functional standpoint, enzymes falling within Enzyme Commission numbers 3.4.x.x (wherein x is an integer) can be used in the present invention. These enzymes include, but are not limited to, the enzyme classifications listed in Table 1.

TABLE 1

| EC Number | Common Name |
|---|---|
| 3.4.11.x | amino peptidases |
| 3.4.13.x | dipeptidases |
| 3.4.14.x | dipeptidyl and tripeptidyl peptidases |
| 3.4.15.x | peptidyl dipeptidases |
| 3.4.16.x | serine carboxypeptidases |
| 3.4.17.x | metallocarboxypeptidases |
| 3.4.18.x | cysteine carboxypeptidases |
| 3.4.19.x | omega peptidases |
| 3.4.21.x | serine endopeptidases (proteinases) |
| 3.4.22.x | cysteine endopeptidases (proteinases) |
| 3.4.23.x | aspartic endopeptidases (proteinases) |
| 3.4.24.x | metalloendopeptidases (proteinases) |

Preferred proteases include those having EC 3.4.21.6 and 3.4.24.28. Preferred peptidases include those having E( 3.4.11.1. However, the listing presented in Table 1 is fc illustration only. In short, any combination of one or mor enzymes having protease activity and one or more enzyme having peptidase activity which, in combination or i sequence, will successfully cleave the proteins found withi natural latex rubber into fragments small enough to b non-allergenic can be utilized in the present method. A wid range of suitable enzymes are available from an equall large number of international commercial suppliers. (See th Examples, below.)

The method generally proceeds in three steps: p adjustment, followed by treatment with proteases, followe by treatment with peptidases. Although the preferred methc includes all three steps, the pH adjustment step may t omitted if unnecessary, and the protease and peptida: treatments may be combined into a single step if suitable enzymes are selected. Each of these steps will now be described in greater detail.

Adjusting Emulsion pH

Ammoniated 30 and 60% latex emulsions typically have pH's ranging from 9 to 11, which is generally too basic for optimum performance of the preferred enzymes. The preferred pH for hydrolysis with proteases of animal origin (preferred) is in the range of from about 9.50 to about 9.55. Non-ammoniated natural latex rubber may already fall within this range, in which case adjustment of the pH is unnecessary and can be omitted. Likewise, the use of proteases which function at acceptably high activities within the pH range of ammoniated natural rubber latex may also render this step unnecessary. However, it must be noted that the adage "time is money" is particularly applicable here. The method will function without adjustment of the pH, but omission of the pH adjustment step may make the time period required for sufficient hydrolysis unacceptably long from an economic standpoint.

The pH can be reduced by any number of well known means. For example, the pH of ammoniated latex can be reduced by very practical procedures, the preferred being: (1) evaporation of the ammonia; (2) bubbling carbon dioxide through the latex; or (3) a combination of both of these procedures.

Treatment with Proteases

In the first treatment step, an aqueous protease enzyme solution having a pH activity optimimum close to that of the latex is added to the natural rubber latex and the mixture allowed to digest for a time sufficient to hydrolyze the protein allergens contained therein, generally from 1 to 10 days. The mixture is gently agitated every 2 to 12 hours to encourage complete hydrolysis.

It is preferred that the protease solution added to the latex yields a protease activity in the mixture equal to or greater than about 50,000 N.F. units (see 1990 U.S. Pharmacopeia, p. 777–8) per liter of 30% latex or an equivalent ratio thereof. For example, the preferred activity in 60% latex is preferably equal to or greater than 100,000 units per liter. While smaller doses of enzyme activity will function, the time required for sufficient hydrolysis becomes unacceptably long.

An illustrative protease treatment is as follows: Sufficient commercial pancreatin to yield a dose of 100,000 protease units per liter of 60% latex emulsion is first solubilized in an aqueous solution of 10% total solids. The pH of this solution is adjusted to match that of the natural rubber latex to be treated (i.e., from about pH 9.50 to about pH 9.55) (ammonia hydroxide). The solution is then centrifuged to pellet the solids and the supernatant containing the protease activity is added to the natural rubber latex and thoroughly mixed and allowed to digest.

It is much preferred that the treatment take place in a vapor-tight vessel. This greatly speeds the hydrolysis. This hydrolysis mixture is stirred several times daily until a preferred degree of hydrolysis (DH, see *J. Agric. Food Chem.* (1979) 27:1256) of from about 20% to about 27% is reached. For most latexes, this occurs within 2 to 3 days, although the required time is a variable which depends upon the type of latex being treated, the enzymes utilized, the pH and the change in pH caused by the hydrolysis, the amount of agitation, the ambient temperature, etc.

The proteases treatment step solubilizes the insoluble proteins contained within the natural rubber latex and also hydrolyzes both the soluble and the insoluble proteins. The pH typically drops 0.2 to 0.3 units within 24 hours. The reaction is continued for a period of time necessary to yield a sufficiently large DH and also to permit the proteases to autodigest themselves. As noted above, stirring in a vapor tight container will effectively reduce the time required several-fold.

Treatment with Peptidases

Here, the treatment with peptidase proceeds in much the same fashion as treatment with proteases. An aqueous peptidase enzyme solution having a pH activity optimum close to that of the latex treated with proteases is added to the latex and the mixture allowed to digest for a time sufficient to hydrolyze the protein allergens contained therein, again generally from 1 to 10 days. The mixture is gently agitated every 2 to 12 hours to encourage complete hydrolysis.

Illustratively: Pancreatin peptidases sufficient to yield an activity of 600 carboxypeptidase B units (Sigma Company (St. Louis, Mo.) assay, December 1986) per liter of reaction latex mixture from the preceding step is solubilized as described above for the protease treatment. The pH of the peptidase solution is then adjusted to that of the protease-treated latex (generally on the order of about pH 9.25). The peptidase solution is then added to the latex. Digestion is preferably performed in a vapor-tight vessel to speed the hydrolysis.

Optionally, a solution of soluble leucine amino peptidase may also be added to the protease-treated latex at the rate of from about 100 to about 150 units (Sigma Company (St. Louis, Mo.) assay ESAL-AK, November 1983) or more per liter of 60% latex emulsion. The reaction mixture is stirred several times daily.

Typically 5–7 days are required to insure achieving a preferred 55 to 60% DH. Again, the time required is a variable which will vary greatly depending upon the parameters of any given treatment (e.g., temperature, agitation, amount of enzyme added, etc.).

When the protease treatment and the peptidase treatment yield the preferred DH's the allergenicity of the latex is reduced below detectable levels (RAST assay). Generally, extracts of natural rubber latex so treated contain hydrolysis products with the molecular weight range of from about 200 to about 1000 Da.

One-Step Method

The present invention also includes a one step hydrolysis wherein solutions of proteases and peptidases are simultaneously added to the natural rubber latex. This approach is suitable so long as the enzymes do not autodigest themselves before the natural rubber latex protein hydrolysis is complete.

An illustrative one-step hydrolysis proceeds as follows: To a low ammonia, 60% rubber solids latex is added from about 300 to about 900 units ("LAP units" Novo Nordisk method EAL-SM-0298.02/01) per liter leucine amino peptidase (EC 3.4.11.1) which also contains from about 0.01 to about 0.10 Anson Units per gram of protease (Novo Nordisk procedure AF 4). Typically, the reaction time ranges from about 2 days to about 10 days, depending upon the temperature and amount of agitation. Performing the reaction in a vapor-tight vessel considerably speeds the hydrolysis.

High ammonia latexes and compounded latexes may also be treated in a noe-step reaction by adding from about 0.1 to about 0.5 AU of an alkaline protease (EC 3.4.21.26) per liter of latex to the leucine amino peptidase reagent mixture described immediately above.

After the enzyme treatment is complete, the pH of the latex can be raised to its original value and the latex compounded in standard fashion.

Point of Application

The application of this invention may be made conveniently at a number of different points in the latex preparation process. The first point where the method can be practiced is by treatment of the natural rubber latex as it is collected and pooled from the trees. Typically, raw (or "green") latex contains about 30% rubber solids. However the concentration of rubber solids can vary considerably, and should be carefully measured to ensure that a sufficient amount of enzymes are added during the treatment.

Applying the treatment at this very early stage of natural rubber latex production has the advantage of greater Lowry test protein removal during the subsequent centrifuging to 60% latex. Following the first centrifuging, the latex emulsion may be diluted and again centrifuged to 60% latex in conventional fashion to further reduce the Lowry test protein in the twice centrifuged latex emulsion.

Another point of application is after the raw emulsion has been centrifuged to 60% latex, either before or after the addition of ammonia, but before compounding of the latex.

The method may also be applied after compounding of the latex, but only in certain types of compounded latex emulsions. Compounding natural rubber latex entails the addition of a wide range of chemicals to the natural rubber latex, including vulcanizing agents, accelerators, activators, blockers, retarders, anti-degradants, preservatives, odorants, colorants, stabilizers, and the like. Many widely used accelerators and activators are zinc compounds which will effectively inhibit the activity of any proteases or peptidases added to the compounded latex. Consequently, the method may be practiced only on those compounded natural rubber latexes which do not contain protease or peptidase inhibitors.

Product-by-Process

The natural rubber latex which results from the above-described treatment is notably different from natural rubber latex in that it is characterized by an average molecular weight of peptides which is far smaller than in untreated latex and the peptide distribution in the treated latex is much narrower than in untreated latex. Natural rubber latex treated according to the preferred embodiment of the present invention generally has a molecular weight distribution of peptides and amino acids ranging from about 200 to about 1000 Daltons. This corresponds to an average peptide length of 8 or fewer amino acid residues. In comparison, the molecular weight distribution of protein components of untreated natural rubber latex ranges from about 2000 to 100,000 Daltons.

It is preferred that the treatment yield a natural rubber latex containing peptides whose average number of amino acid residues is 8 or fewer, and more preferably still, 6 or fewer. These average molecular weight limits are preferred because peptides smaller than about 8 residues are generally too small in size to elicit a allergenic response in humans. At an average peptide molecular weight of 6 amino acid residues or fewer, the resultant natural rubber latex is effectively protein non-allergenic (i.e., allergenicity due to protein allergens is smaller than the detection limits of standard tests).

Articles of Manufacture

The non-protein allergenic natural rubber latex which results from the present treatment can be compounded and utilized in conventional manner to fabricate any type of article of manufacture normally fabricated from natural rubber latex. Because of the non-protein allergenicity of the latex and the articles fabricated from the latex, articles of manufacture which act as physical barriers to the movement of liquids and pathogens are preferred.

Predominant among the articles of manufacture included within the present invention are latex barrier devices such as surgical and examination gloves, condoms, diaphragms, dams, stents, catheters, and other devices which during their use come into contact with humans. As noted above, in the case of latex gloves, medical devices, and the like, allergic reactions to proteins found in natural rubber latex pose a potential and serious problem both to the health professional wearing the gloves or inserting the catheter and the subject being treated.

Likewise, with the advent of acquired immune-deficiency syndrome (AIDS), the use of condoms as both a birth control device and as a means to stem the transmission of the disease has soared. However, due to protein allergenicity, many people cannot use natural rubber latex condoms. While natural membrane condoms are commercially available these condoms are not sufficiently impermeable to act as a barrier to transmission of the HIV virus, the causative agent of AIDS.

As can be easily envisioned, since the non-protein allergenic natural rubber latex of the present invention can be formulated in the same fashion as conventional natural rubber latex, any article of manufacture conventionally fabricated from natural rubber latex can be fabricated using the present non-protein allergenic natural rubber latex.

EXAMPLES

The following Examples are included herein solely as a illustrative aid to provide a more complete understanding of the present method and the product formed thereby. The Examples do not limit the scope of the invention disclosed and claimed herein in any fashion.

Example 1
Treatment of 30% Ammoniated Natural Rubber Latex

For this Example, an ammoniated 30% natural rubber latex sample from Malaysia was used. The sample had starting pH of 10.45.

The pH of the latex sample was reduced to 9.50 by ammonia evaporation. Then 50,000 protease units (available commercially from Novo Nordisk N.A. Inc., New York N.Y.; Sigma Chemical, St. Louis, Mo.; and many others) per latex liter were solubilized in a 10% aqueous solution, the solution centrifuged to eliminate the insolubles, and the supernatant decanted and its pH raised to 9.50 by the addition of ammonia. This protease solution was then added to the raw latex emulsion.

The hydrolysis mixture was placed in a vapor tight container after thorough stirring. After 18 hours at 22° C the pH of the reaction mixture was 9.28. The mixture was stirred twice daily for two additional days.

A solution of carboxypeptidase B (commercial purchased) was then prepared as noted above for the protease and the pH of the solution adjusted to 9.25. The solution was then added to the first stage reaction mixture the rate of 300 units per liter. The mixture was allowed react in the same vapor tight container as in the first step 22° C. and stirred twice daily for five days. The hydrolysis was then terminated by raising the pH of the reaction mixture to 10.5.

Portions of this hydrolyzed raw latex were then diluted with 3 parts of ammoniated water, pH 10.5, followed by pH reduction to 7.0 with phosphoric acid, heated to 80° C. to minimize the aqueous phase in the latex curd, and then centrifuged.

The aqueous phase from the centrifugation ("Treated") was analyzed by the following conventional methods and the results compared to the original latex sample ("Control") which had been diluted and treated in the same manner. The results are presented in Tables 2 and 3:

TABLE 2

| Test | Control | Treated |
| --- | --- | --- |
| Lowry (mg/ml) Protein | 11.00 | 11.1 |
| Bradford (mg/ml) Protein | 4.25 | <0.1 |
| Allergens (units/ml, LEAP) | 500 | 0 (not found) |
| Degree of Hydrolysis (DH) | 3 | 58 |
| Avg. Mol. Wt. (Da) | 45,000 | 620 |

TABLE 3

| MW Size Range* | Control (%) | Treated (%) |
| --- | --- | --- |
| 1 to 3 residues | <1 | 92 |
| 4 to 6 residues | 1 | 6 |
| 7 to 10 residues | 1 | 1 |
| 11 to 20 residues | 3 | <1 |
| Greater than 20 | 95 | trace |

*Molecular weights were determined by HPLC in standard fashion. Briefly, approximately 40 mg of extracted solids were placed on a size fractionation column along with the molecular weight standards, trypsin inhibitor, and bacitracine. Detection was by absorbance at 280 nm.

Comparing the results from the "Treated" and "Control" samples in this Example indicates that: (1) adding hydrolyzing enzymes slightly increased the protein content as measured by the Lowry test. However, the Bradford test, which distinguishes amino acids and small peptides from proteins showed a marked reduction in the "Treated" sample as compared to the "Control" sample.

The allergen content of the "Control" sample in this Example was typical of raw latex. The allergen content of the "Treated" sample was below the detection limit of the test.

The average molecular weight figures indicate that a great deal of protein hydrolysis has taken place in the "Treated" sample. The percent degree of hydrolysis in the "Treated" sample clearly indicates that more than half of the peptide bonds of the latex proteins have been hydrolyzed. The distribution of molecular weights of the proteins and peptides contained in the "Treated" sample confirms the extensive protein hydrolysis.

Example 2
Treatment of 60% Ammoniated Natural Rubber Latex

In this Example, a commercial sample of 60% natural rubber latex emulsion was provided by a latex glove manufacturer and treated as described in Example 1, with the exception that the enzyme concentrations were doubled. Following the eight-day, two-stage hydrolysis, the pH of the reaction mixture was raised to 10.7 and was sent to the manufacturer for glove manufacture and evaluation.

Table 4 presents the results of protein determinations by both the Lowry and Bradford tests and allergen determination on the latex prior to compounding; Table 5 reports the results of various tests performed on the gloves manufactured from the treated ("Treated") latex and untreated ("Control") latex:

TABLE 4

| Sample | Lowry Proteins (μg/gm) | Bradford Protein (μg/gm) | Allergens (μg/ml) |
| --- | --- | --- | --- |
| Control | 505 | 162 | 24 |
| Treated | 545 | trace | not found |

After the tests shown in Table 4 were performed, the samples were then hot compounded and dipped to make latex test sheets and gloves. The following results were reported:

TABLE 5

| Sample | Tensile Strength | Ultimate Elongation | 300% Modulus | Extractable Protein, ppm |
| --- | --- | --- | --- | --- |
| Control | 22.3 | 1015 | 0.84 | 145 |
| Treated | 21.9 | 1032 | 0.77 | 360 |

The Lowry protein results show an increase in the protein of the treated sample which is believed to be due to the added enzyme protein. However, the Bradford protein results suggest that practically all the protein contained in the sample had been hydrolyzed into smaller amino acids and peptides. As in Example 1, allergens were not found in the treated latex.

The physical characteristics of the "Treated" and "Control" vulcanized latexes were not significantly different from each other or from the physical characteristics of commercially-available gloves.

As expected, the extractable protein from gloves manufactured from the treated latex was less than half that found in gloves manufactured from untreated latex.

This Example indicates that the enzyme treatment of the invention does not materially alter the manufacturing characteristics of latex emulsion. Nor does the treatment adversely effect the physico-mechanical properties of the finished product.

The treatment does, however, effectively eliminate the allergenicity of latex articles manufactured from the treated latex.

Example 3
Treatment Using Microbial-Derived Enzymes and Comparative Examples

A 60% natural rubber latex emulsion was prepared by lowering the pH to 9.55 by bubbling carbon dioxide through the emulsion. The emulsion was then divided into four lots and treated in the following manner:

TABLE 6

| Sample | Treatment |
| --- | --- |
| Control | Held at 22° C., stirred twice daily for 9 days, pH then returned to 10.3 with ammonia. |
| A. | Added 1 gm/liter of latex emulsion of "ALCALASE"-brand alkaline protease*, held at 22° C., with twice-daily stirring for 3 days, 24 hr pH = 9.26, then added "FLAVOURZYME"-brand amino peptidase* at the rate of 1 gm/1, continued stirring for six days, then returned pH to 10.3. |
| B. | Added 1 gm/liter of "ALCALASE"-brand alkaline protease*, held at 22° C. with twice daily stirring for 9 days, 24 hr pH = 9.27, then returned pH to 10.3. |

TABLE 6-continued

| Sample | Treatment |
|---|---|
| C. | Added 1 gm/liter of "FLAVOURZYME"-brand amino peptidase*, held at 22° C. with twice daily stirring for 9 days, 24 hr pH = 9.48, then returned to 10.3. |

*"ALCALASE" and "FLAVOURZYME" are registered trademarks of Novo Nordisk Corporation (Bagsvaerd, Denmark) for microbial-derived alkaline proteases and amino peptidases, respectively. These enzymes are available in the U.S. from Novo Nordisk North America Inc, New York, NY.

After the treatments, the four samples were diluted, acidified, and centrifuged as in Example 1. The supernatants were then examined as follows:

TABLE 7

| Analysis | Control | A | B | C |
|---|---|---|---|---|
| Lowry Protein | 9.7 | 9.9 | 9.8 | 9.8 |
| Bradford Protein | 3.9 | trace | 1.2 | 2.7 |
| Allergens (LEAP) | 430 | not found | 290 | 367 |
| % DH | 4 | 61 | 27 | 11 |

The combination of microbial proteases and peptidases gave results which are very similar to those found with the pancreatic-sourced enzymes used in Examples 1 and 2). As shown in Table 7, when used singly, these enzymes do not eliminate the protein allergens of latex which cause Type I allergenicity. These results confirm that protease hydrolysis in conjunction with peptidase hydrolysis is necessary to achieve a significant reduction in allergenicity. As shown by this Example, when used alone, these enzymes are not effective to reduce the allergen content of natural rubber latex.

The present invention is not confined to the particular reagents, enzymes, and treatment times and temperatures illustrated and described above, but includes all modified and equivalent forms thereof as come within the scope of the following claims.

What is claimed is:

1. A method of neutralizing protein allergens in natural rubber latex comprising treating the natural rubber latex with a protease enzyme and a peptidase enzyme such that the protein allergens contained within the natural rubber latex are degraded to polypeptide fragments and amino acids which are non-allergenic to humans.

2. The method of claim 1, wherein the natural rubber latex is treated such that the protein allergens contained therein are degraded to polypeptide fragments which are, on average, no greater than 7 amino acid residues in size as measured by HPLC.

3. The method of claim 1, wherein the natural rubber latex is such that the protein allergens contained therein are degraded to polypeptide fragments which are, on average, no greater than 1000 Daltons in molecular weight as measured by HPLC.

4. The method of claim 1, wherein raw natural rubber latex is treated.

5. The method of claim 1, wherein centrifuged, non-ammoniated natural rubber latex is treated.

6. The method of claim 1, wherein centrifuged, ammoniated natural rubber latex is treated.

7. The method of claim 1, wherein compounded natural rubber latex which is free of protease and peptidase inhibitors is treated.

8. The method of claim 1, wherein the natural rubber latex is treated with a protease enzyme and a peptidase enzyme derived from mammalian sources.

9. The method of claim 1, wherein the natural rubber latex is treated with a protease enzyme and a peptidase enzyme derived from microbial sources.

10. The method of claim 1, wherein the treatment step comprises treatment with an alkaline protease and a leucine amino peptidase.

11. A method of neutralizing protein allergens in natural rubber latex comprising treating the natural rubber latex with a protease enzyme and a peptidase enzyme, wherein the treating step comprises:

(a) in a first treatment step, treating the natural rubber latex with a protease enzyme; and then (b) in a second treatment step, treating the natural rubber latex with a peptidase enzyme.

12. The method of claim 11, wherein in the first treatment step a degree of hydrolysis of soluble and insoluble protein allergens of between about 20% and about 27% is obtained; and in the second treatment step a degree of hydrolysis of soluble and insoluble protein allergens of between about 55% and about 60% is obtained.

13. The method of claim 11, wherein in the first treatment step, the natural rubber latex is treated with at least 100,000 protease units per liter of 60% latex rubber or an equivalent ratio thereof; and in the second treatment step, the natural rubber latex is treated with at least 600 carboxypeptidase B units per liter of 60% percent latex rubber or an equivalent ratio thereof.

14. The method of claim 11, wherein in the first treatment step, the protease enzyme is solubilized in an aqueous solution, the solution is then clarified to yield a supernatant containing protease activity, and the supernatant is added to the natural rubber latex; and in the second treatment step, the peptidase enzyme is solubilized in an aqueous solution, the solution is then clarified to yield a supernatant containing peptidase activity, and the supernatant is added to the natural rubber latex.

15. The method of claim 11, further comprising the step of, before the first treatment step, adjusting the pH of the natural rubber latex to be treated to approximate that of a pH activity optimum of the protease to be used in the first treatment step.

16. The method of claim 11, wherein raw natural rubber latex is treated.

17. The method of claim 11, wherein centrifuged, non ammoniated natural rubber latex is treated.

18. The method of claim 11, wherein centrifuged, ammo niated natural rubber latex is treated.

19. The method of claim 11, wherein compounded natural rubber latex which is free of protease and peptidase inhibitors is treated.

20. The method of claim 11, wherein in the first treatment step the natural rubber latex is treated with a proteas enzyme derived from mammalian sources and in the secon treatment step the natural rubber latex is treated with peptidase enzyme derived from mammalian sources.

21. The method of claim 11, wherein in the first treatment step the natural rubber latex is treated with a proteas enzyme derived from microbial sources and in the secon treatment step the natural rubber latex is treated with peptidase enzyme derived from microbial sources.

22. The method of claim 11, wherein the first treatment step comprises treatment with an alkaline protease and th second treatment step comprises treatment with a leucin amino peptidase.

23. The method of claim 11, wherein the first and secon treatment steps are performed in a vapor-tight vessel.

24. A protein allergen-free natural rubber latex produce according to the method of claim 1.

25. A protein allergen-free natural rubber latex produced according to the method of claim 11.

26. Natural rubber latex articles of manufacture fabricated from protein allergen-free natural rubber latex produced according to the method of claim 1.

27. The natural rubber latex articles of claim 26 which are barrier gloves.

28. Natural rubber latex articles of manufacture fabricated from protein allergen-free natural rubber latex produced according to the method of claim 11.

29. The natural rubber latex articles of claim 28 which are barrier gloves.

* * * * *